United States Patent [19]

Sullivan

[11] Patent Number: 5,015,410

[45] Date of Patent: May 14, 1991

[54] PAINT STRIPPER COMPOSITIONS CONTAINING N-METHYL-2-PYRROLIDONE, ALIPHATIC HYDROCARBONS, AND AROMATIC HYDROCARBONS

[75] Inventor: Carl J. Sullivan, Exton, Pa.

[73] Assignee: Arco Chemical Technology, Inc., Wilmington, Del.

[21] Appl. No.: 482,115

[22] Filed: Feb. 20, 1990

[51] Int. Cl.$^5$ .......................... C09D 9/00; C11D 7/50
[52] U.S. Cl. .................... 252/166; 252/162; 252/170; 252/171; 252/167; 252/DIG. 8
[58] Field of Search ............... 252/162, 166, 170, 171, 252/167, DIG. 8

[56] References Cited

U.S. PATENT DOCUMENTS

| | | | |
|---|---|---|---|
| H300 | 7/1987 | Hearst | 134/22.19 |
| 4,085,059 | 4/1978 | Smith et al. | 252/118 |
| 4,120,810 | 10/1978 | Palmer | 252/153 |
| 4,276,186 | 6/1981 | Bakos et al. | 252/170 |
| 4,617,251 | 10/1986 | Sizensky | 252/162 |
| 4,666,626 | 5/1987 | Francisco | 252/153 |
| 4,732,695 | 3/1988 | Francisco | 252/162 |
| 4,749,510 | 6/1988 | Nelson | 252/166 |
| 4,780,235 | 10/1988 | Jackson | 252/162 |
| 4,836,950 | 6/1989 | Madsen et al. | 252/170 |
| 4,927,556 | 5/1990 | Pokorny | 252/173 |

*Primary Examiner*—Olik Chaudhuri
*Assistant Examiner*—J. Silbermann
*Attorney, Agent, or Firm*—Stephen D. Harper

[57] ABSTRACT

A paint stripper and coatings remover composition free of methylene chloride is disclosed which contains N-methyl pyrrolidone, an aliphatic hydrocarbon such as mineral spirits, and a miscibilizing solvent such as an aromatic hydrocarbon. The composition preferably also contains one or more additives such as a surfactant, thickener, or accelerator. Paint strippers having low volatility, outstanding effectiveness, and low toxicity may be obtained.

17 Claims, No Drawings

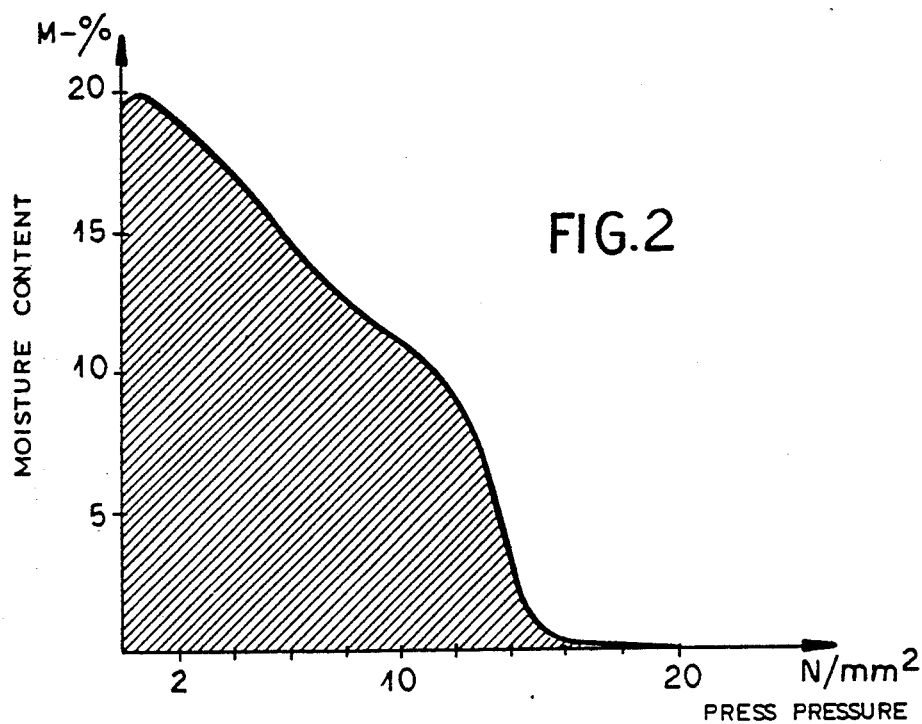
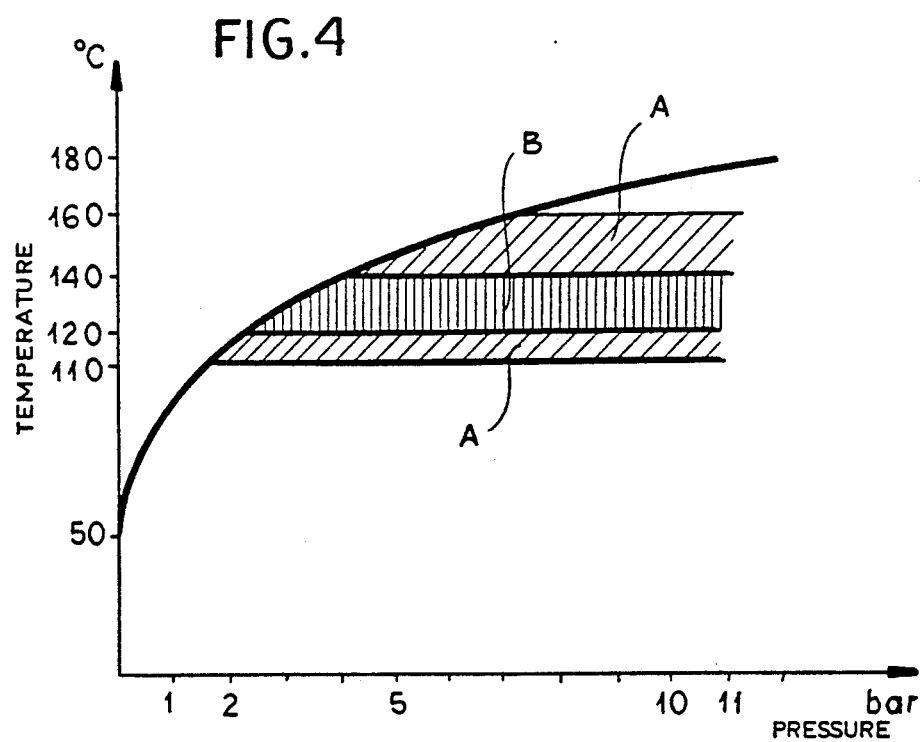

PAINT STRIPPER COMPOSITIONS CONTAINING N-METHYL-2-PYRROLIDONE, ALIPHATIC HYDROCARBONS, AND AROMATIC HYDROCARBONS

FIELD OF THE INVENTION

This invention relates to coatings remover compositions which are free of methylene chloride and which can be utilized to remove partially or fully cured paints and other coatings from a variety of substrates.

BACKGROUND OF THE INVENTION

Solvent based paint removers have achieved considerable popularity and widespread use because of their ability to easily remove fully or partially cured coatings from substrates. Methylene chloride and other chlorinated hydrocarbon solvents have long been used in such formulations because of their effectiveness and low cost. However, methylene chloride is highly toxic and is suspected of being a potential carcinogen. In addition, methylene chloride and other halogenated compounds are environmentally undesirable due to their suspected role in the destruction of the ozone layer. Since paint removers are commonly rinsed off substrates after use using water, contamination of ground water by such solvents is also a potential problem.

N-Methyl pyrrolidone (NMP) is a preferred substitute for chlorinated solvents in coating remover formulations because of its effectiveness, low toxicity, biodegradability, and high flash point. Although typically not as fast as methylene chloride in "lifting" the paint from a substrate, NMP has a much lower vapor pressure and thus can be readily used at elevated temperatures or in a soak tank. In addition, NMP has such a low rate of evaporation that lifted coatings may be readily peeled from the substrate many hours after lifting. In a methylene chloride-based formulation, the lifted film will generally re-adhere to the substrate if the coating is not mechanically removed soon after lifting occurs. Several applications of a methylene chloride-based formulation may be necessary to completely remove thick or multiple layer coatings due to the rapid rate of solvent evaporation, while a single application of an NMP-based formulation may be sufficient.

A deterrent to the use of N-methyl-2-pyrrolidone as the primary solvent in coatings remover formulations has been the relatively high cost of NMP. For this reason, a number of solvent blends containing NMP have been developed having performance approximately equivalent to that of pure NMP For example, a low toxicity paint remover containing NMP and an aromatic hydrocarbon is described in U.S. Pat. No. 4,120,810. U.S. Pat. No. 4,749,510 teaches a solvent blend effective as a coatings remover in which NMP, an aromatic hydrocarbon, and formic acid are combined with surfactants, thickeners, and corrosion inhibitors. NMP has also been blended with benzyl alcohol and aromatic naphtha to obtain a useful paint remover, as taught in U.S. Pat. No. 4,732,695. U.S. Statutory Invention Registration H300 describes NMP and monoethanol amine mixtures which are particularly effective on thick epoxy coatings. A paint stripper composition containing predominatly oxo-hexyl acetate and cyclohexanone together with minor amounts of N-methyl-2-pyrrolidone is disclosed in U.S. Pat. No. 4,666,626. A blend of NMP, alkanolamine, and an alkali or alkaline earth metal base has been found to be effective in removing paint from a substrate as shown in U.S. Pat. No. 4,276,186. U.S. Pat. No. 4,085,059 teaches a foam-type coating remover containing NMP and a water based carrier.

N-Methyl-2-pyrrolidone is clearly a preferred solvent component in paint stripping applications due to its effectiveness, low volatility, low toxicity, and biodegradability. However, there is a need for an improved coatings remover composition wherein NMP is diluted with less expensive solvents to reduce the cost of the formulation while retaining the desirable performance characteristics of the N-methyl-2-pyrrolidone.

SUMMARY OF THE INVENTION

This invention provides a coatings remover consisting essentially of a homogeneous blend of from about 15 to 80 percent by weight of N-methyl-2-pyrrolidone, from about 10 to 60 percent by weight of at least one aliphatic hydrocarbon, and from about 10 to 60 percent by weight of at least one miscibilizing solvent selected from the group consisting of aromatic hydrocarbons, esters, ketones, glycol ethers, and glycol ether esters. Also provided is a coatings remover consisting essentially of the aforesaid homogeneous blend and an effective amount of at least one additive selected from the group consisting of surfactants, thickeners, and accelerators.

It has unexpectedly been discovered that although aliphatic hydrocarbons and aromatic hydrocarbons are generally ineffective when used alone as the solvent component of a paint stripper formulation, a combination of these solvents with N-methyl-2-pyrrolidone can provide a composition comparable in effectiveness to compositions containing NMP alone. By virtue of the presence of substantial amounts of less expensive solvent, the formulations of this invention are significantly cheaper to produce and thus more acceptable commercially than NMP-based paint strippers. In addition, the paint removers of this invention do not contain methylene chloride or other chlorinated solvents and consequently are safer to use than conventional methylene chloride-based formulations.

DETAILED DESCRIPTION OF THE INVENTION

Figure 1:
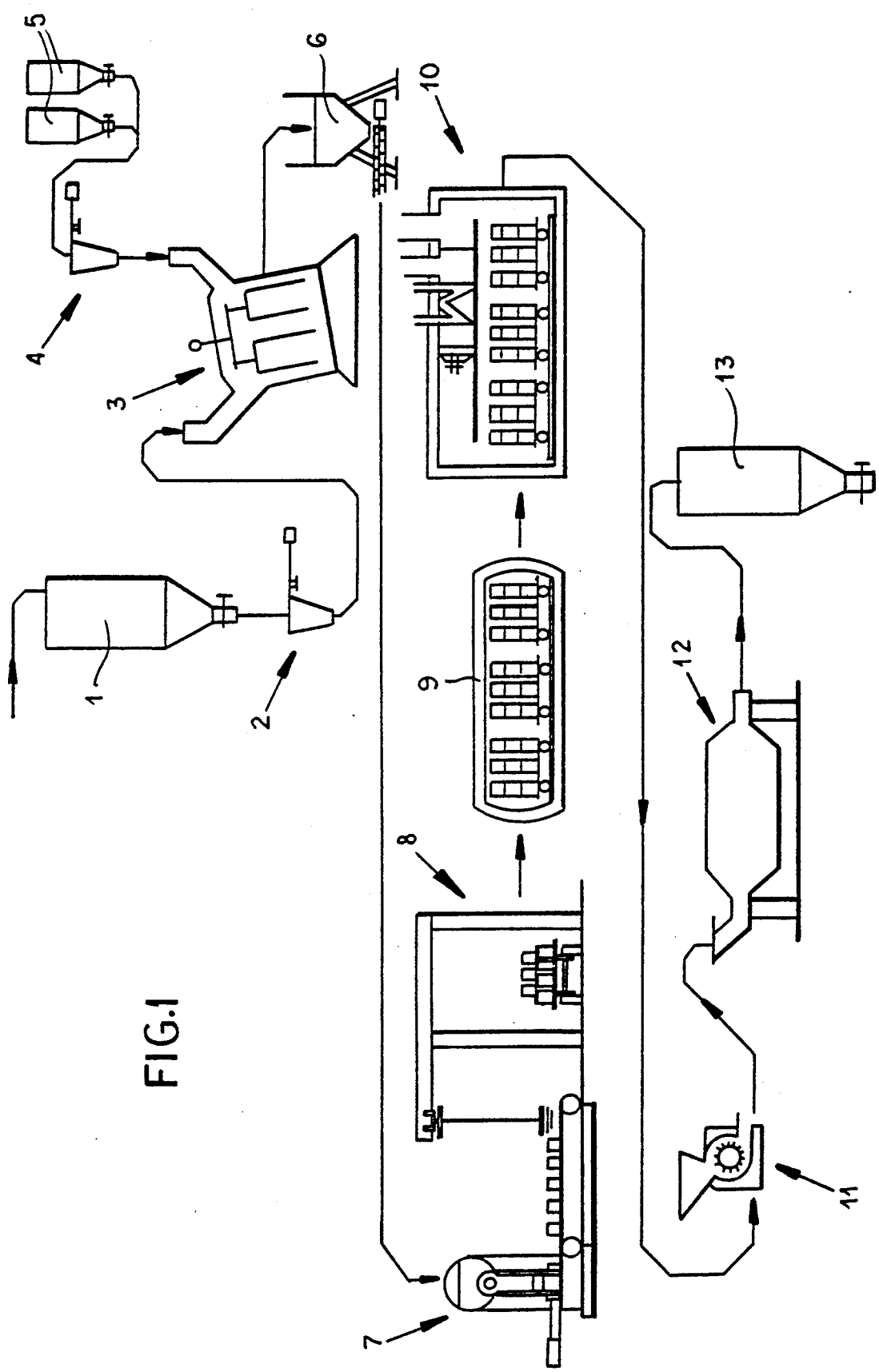

N-methyl-2-pyrrolidone is employed as a primary component of the homogeneous blends of this invention. This well-known compound may be readily prepared by a number of synthetic routes. For example, 1,4-butanediol can be cyclodehydrogenated to give butyrolactone. Reaction of butyrolactone with methylamine yields N-methyl-2-pyrrolidone. Optimum coatings removal performance is generally obtained when the concentration of N-methyl-2-pyrrolidone is at least about 30 weight percent of the blend composition. To maximize the cost-performance characteristics of the blend, however, the concentration of N-methyl-2-pyrrolidone can be as low as about 15 weight percent. Although N-methyl-2-pyrrolidone concentrations higher than about 80 weight percent could be used, the cost of the blend begins to approach that of pure NMP without a significant increase in efficacy.

One or more aliphatic hydrocarbons are used as a second component of the homogeneous blends of this invention. The aliphatic hydrocarbon preferably contains from 6 to 30 carbon atoms and is liquid at ambient temperatures. The boiling point of the aliphatic hydrocarbon is preferably at least about 100° C. in order to minimize evaporation losses after application of the blend to the coating to be removed. Mixtures of aliphatic hydrocarbons such as the aliphatic hydrocarbon mixtures obtained by petroleum refining are especially preferred for use because of their low cost and availability. Examples of such aliphatic hydrocarbon mixtures include mineral oil (also referred to as liquid petrolatum or liquid paraffin) and mineral spirits (also referred to as ligroin or petroleum spirits). Other specific commercially available aliphatic hydrocarbons suitable for use in this invention are described in *Industrial Solvents*, 3rd. Ed., E. W. Flick, Ed., Noyes Data Corp. (1985), pp. 57-83.

A third component of the homogeneous blends of this invention is a miscibilizing solvent selected from the group consisting of aromatic hydrocarbons, esters, ketones, glycol ethers, glycol ether esters, and mixtures thereof. The presence of the third component is essential due to the immiscibility of N-methyl-2-pyrrolidone and the aliphatic hydrocarbon components. The third component serves to compatibilize the other two components to provide a one phase blend. The efficacy of the blends of this invention in the removal of certain types of coatings may be controlled as desired by varying the identity of the miscibilizing solvent. Characteristics such as flash point, odor, toxicity, environmental acceptance and regulatory compliance may also be readily altered by judicious choice of the third component as will be apparent to those skilled in the art.

The use of aromatic hydrocarbons as the miscibilizing solvent is preferred due to their relatively low cost and effectiveness. Suitable aromatic hydrocarbons include, but are not limited to, $C_1-C_8$ alkyl derivatives of benzene, naphthalene, and $C_1-C_8$, alkyl derivatives of naphthalene, such as toluene, xylene (o, m, or p), cumene, ethyl benzene, mesitylene, durene, sec-amylbenzene, n-butylbenzene, naphthalene, methyl naphthalene ($\alpha$ or $\beta$), and the like. Mixtures of aromatic hydrocarbons such as aromatic naphtha may also be advantageously employed. Additional examples of suitable commercially available aromatic hydrocarbons may be found in *Industrial Solvents*, 3rd Ed., E. W. Flick, Ed., Noyes Data Corp. (1985), pp. 57-83.

Esters may also be used as the miscibilizing solvent, particularly $C_4-C_{12}$ aliphatic and aromatic esters such as n-butyl acetate, vinyl acetate, sec-butyl acetate, ethyl acetate, butyrolactone, amyl acetate, cyclohexyl acetate, amyl propionate, ethylene glycol monoacetate, ethylene glycol diacetate, ethyl propionate, ethyl n-butyrate, ethyl caprylate, ethyl valerate, methyl benzoate, phenyl acetate, and the like and mixtures thereof. Ketones, especially $C_5-C_{12}$ aliphatic and aromatic ketones, are also suitable for use as the third component. Examples of useful ketones include, but are not limited to, cyclohexanone, ethyl butyl ketone, 4-methoxy-4-methyl-2-pentanone, acetophenone, diisobutyl ketone, methyl isobutyl ketone, methyl amyl ketone, methyl heptyl ketone, isophorone, diethyl ketone, methyl ethyl ketone, mesityl oxide, cyclopentanone, and the like and mixtures thereof. Glycol ethers represent another class of compounds which can be utilized. Preferred glycol ethers include $C_1-C_6$ alkyl mono- and diethers of $C_2-C_9$ alkylene glycols such as propylene glycol monomethyl ether, propylene glycol mono-t-butyl ether, ethylene glycol mono-n-butylether, ethylene glycol di-n-butyl ether, dipropylene glycol mono-methyl ether, tripropylene glycol mono-methyl ether, triethylene glycol dimethyl ether (triglyme), ethylene glycol mono-ethyl ether, propylene glycol mono-n-propyl ether, propylene glycol mono-n-butyl ether, and the like and mixtures thereof. Glycol ether esters, particularly $C_2-C_4$ carboxylic acid esters of $C_1-C_6$ alkyl monoethers of $C_2-C_9$ alkylene glycols, are suitable for use as the miscibilizing solvent in the blends of this invention. Exemplary glycol ether esters include, but are not limited to, diethylene glycol methyl ether acetate, ethylene glycol methyl ether acetate, propylene glycol methyl ether acetate, ethylene glycol butyl ether acetate, ethylene glycol ethyl ether acetate, ethylene glycol ethyl ether butyrate, and the like and mixtures thereof. Examples of other suitable ketones, esters, glycol ethers, and glycol ether esters may be found in *Industrial Solvents*, 3rd Ed., E. W. Flick, Ed., Noyes Data Corp. (1985), pp. 410-436, 469-500, and 591-635.

The miscibilizing solvent or mixture of miscibilizing solvents is preferably liquid at ambient temperatures (i.e., from about 10° to 40° C.). The boiling point of the miscibilizing solvent is advantageously at least about 75° C., but more preferably is at least about 110° C. Sufficient miscibilizing solvent should be present in the blends of this invention to produce a single phase homogeneous mixture. In general, concentrations of from about 10 to 60 weight percent of the miscibilizing solvent are utilized.

Optionally, an additive may be combined with the homogeneous blends of this invention to modify the performance of the coatings remover. For example, a surfactant or combination of surfactants may be present in order to improve wetting of the coating to be removed and to hasten penetration of the active components. In addition, surfactants facilitate water rinsing and water clean-up of the substrate after removal of the coating. Anionic, cationic, nonionic or amphoteric surfactants or combinations thereof may be utilized. Preferred types of surfactants include, but are not limited to, polyoxyethylene derivatives of aromatic and aliphatic alcohols, (e.g., nonyl phenoxy polyoxyethylene ethanol), alkali metal salts of $C_8$ to $C_{22}$ aliphatic sulfates, (e.g., sodium lauryl sulfate), alkali metal salts of alkyl aromatic sulfonates (e.g., sodium dodecyl benzene sulfonate), dialkyl sulfosuccinates (e.g., dioctyl sulfosuccinate), and the like and mixtures thereof. Examples of other suitable surfactants are described in Cahn et al, "Surfactants and Detersive Systems", Kirk-Othmer Encyclopedia of Chemical Technology, 3rd Ed., (1983) Vol. 22, pp. 332-432. The concentration of surfactant is not critical, but preferably is from about 0.1 to 8 weight percent of the coatings remover composition.

A thickener may also be present in the coatings remover composition of this invention to provide control of the rheological properties of the composition. The removal of partially dried paint removal from automotive paint spray booths, for example, is generally performed by spraying a coatings remover onto the spray booth. The coatings remover must be thin enough to spray easily but must rapidly build in viscosity under low shear conditions to effectively cling to vertical surfaces. A higher viscosity formulation is generally desired if the coatings remover is to be painted on while a low viscosity formulation containing no added thickener is typically used where the coated substrate is to be soaked in a tank. Thickeners may also serve to increase the effectiveness of the coatings removers by decreasing the rate of evaporation of the volatile components after application to a coated substrate. Suitable thickeners include, but are not limited to, alkylated, esterified, and oxyalkylated cellulose derivatives (e.g., ethyl cellulose, cellulose acetate butyrate, hydroxypropyl methyl cellulose and methyl cellulose), organoclays (e.g., "Bentone 38", available from NL Chemicals), fatty acid salts, fumed silica, paraffinic waxes (e.g., polyethylene wax), and the like and mixtures thereof. The concentration of thickener employed will depend upon the end use application but commonly will be from about 0.1 to 15 weight percent of the coatings remover composition. An aliphatic or aromatic alcohol may be employed at a concentration of up to about 20 weight percent of the composition to modify the effects of the thickener. Suitable alcohols include methanol, ethanol, isopropanol, and t-butyl alcohol.

Accelerators may be included as additives at levels of up to about 20 weight percent of the coatings remover in order to enhance removal of highly resistant coatings. The accelerators are believed to accentuate the performance of the composition by chemically attacking the organic binder of the coating and thereby weakening the adhesion and cohesion of the coating. Exemplary accelerators include $C_1$-$C_{22}$ carboxylic acids (e.g., formic, acetic, propionic, oleic, oxalic or hydroxyacetic acid) and organoamines (e.g., ethanolamine, diethanolamine, ethylenediaminetetraacetic acid, morpholine, triethanolamine, triethylamine, or 2-(N,N'-diethylamino)ethanol). Organoamine accelerators are preferred. If an acidic accelerator is used, it may be desirable to also incorporate a corrosion inhibitor to protect the substrate being stripped. Suitable corrosion inhibitors include triethylammonium phosphate and sodium benzoate as well as alkali metal and alkaline earth alkyl aromatic sulfonates. Up to about 3 weight percent corrosion inhibitor is typically employed.

The compositions of this invention may be used to remove a wide variety of paints, finishes, and coatings including, for example, alkyd enamels, acrylic enamels, polyesters, polyurethanes, epoxy resin coatings, latex paints, oil-base paints, shellacs, phenolic coatings, gum varnishes, silicone coatings, polyvinyls, polyvinyl cinnamates, polyamides, polyimides, polyalkyl acrylates, polyalkyl methacrylates, drying oils, polyvinyl acrylates, and cellulosic resins. The substrate may be of any material which is reasonably resistant to the coatings remover such as wood, glass, thermoset resin, thermoplastic resin, or metal (e.g., aluminum alloys, zinc alloys, or galvanized steel). The coated substrate may be treated with the coatings remover by any suitable method, including brushing, spraying, or immersion. The treatment is most conveniently carried out at ambient temperature, but lift time may be shortened as desired by heating the coatings remover and/or substrate. Temperatures of from about 20° C. to 200° C. are generally suitable. The paint removers of this invention may be readily formulated with high boiling components such as mineral oil as the aliphatic hydrocarbon and aromatic naphtha as the miscibilizing solvent to enhance the suitability of the composition for use in high temperature applications. Lift time (i.e., the time at which the coating is released from the substrate) will typically be from about 10 seconds to 10 minutes using the compositions of this invention. After lifting, the coating and paint remover composition are removed from the substrate by mechanical action (i.e., scraping or sanding) or by rinsing with high pressure water.

The method by which the components of the coatings removers of this invention are combined is not critical. Mixing of the components can be accomplished by blending with a mechanical mixer in a tank or other similar vessel. If a thickener is employed, it may be desirable to add the thickener slowly to the solvent components while vigorously mixing the solvents.

From the foregoing description, one skilled in the art can readily ascertain the essential characteristics of this invention and, without departing from the spirit and scope thereof, can make various changes and modifications of the invention to adopt it to various usages, conditions, and embodiments.

The following examples further illustrate this invention, but are not limitative of the invention in any manner whatsoever.

EXAMPLES 1-6

These examples (Table I) demonstrate the unexpected performance advantages of the coating remover compositions of this invention.

Aluminum panels (3"×6") were painted using a base coat of red oxide primer acrylic spray enamel and a top coat of white acrylic spray enamel (Rust-O-Lastic Minit Dri spray enamel, available from Rich-Lux Products Co.). Each coat was approximately 1.5 mil in thickness. Each panel was then treated with the compositions of Table I in three different spots; each spot was ca. 0.5-1 inch in diameter. The time necessary to obtain complete bubbling of the coating from the substrate for each spot was then measured, with the average lift time for each formulation shown in Table I.

While N-methyl-2-pyrrolidone alone (Example 1) or a 50/50 mixture of NMP and xylene lifted the enamel from the substrate, pure xylene (Example 3) and pure mineral spirits (Example 4) did not. NMP and mineral spirits were found to be immiscible (Example 5). A blend of equal amounts of NMP, xylene, and mineral spirits (Example 6), however, not only was homogeneous (i.e., a single phase) but loosened the paint even more rapidly than NMP or the 50/50 NMP/xylene blend. These results were surprising in view of the complete ineffectiveness of the mineral spirits alone and the presence of only 33 weight percent NMP in the coatings remover composition of Example 6.

EXAMPLES 7-12

Example 7 illustrates the preparation of a coatings remover of this invention containing N-methyl-1-pyrrolidone, an aliphatic hydrocarbon (mineral spirits), an aromatic hydrocarbon miscibilizing solvent (xylene), a surfactant ("Monowet MO-70-R"), and a thickener ("Klucel"). Examples 8-12 are comparative compositions containing either NMP, an aliphatic hydrocarbon, or an aromatic hydrocarbon alone (Examples 8, 9, and 10 respectively) or a combination of NMP and an aromatic hydrocarbon alone (Examples 11 and 12) as the solvent component of the paint stripper formulation. The composition of each formulation is shown in Table II.

EXAMPLES 13-18

Examples 13-18 (Table III) compare the effectiveness of the coatings remover of Example 7, having a composition in accordance with this invention, with the performance of other formulations. The testing procedure described above for Examples 1-6 was used; the aluminum panels were painted with the various coatings shown in Table III (ca. 1.5 mil thickness). Mineral spirits (Example 15) and xylene (Example 16) were found to be totally ineffective in loosening three different types of coatings from an aluminum substrate. Formulations containing equal amounts of NMP and an aromatic hydrocarbon as the solvent portion (Examples 11 and 12) lifted the coatings reasonably quickly. However, equivalent performance was achieved using the ternary solvent blend composition of Example 7 (Example 13), despite lowering the NMP concentration from 50 to only 33 weight percent. This result was unexpected given the ineffectiveness of the aliphatic hydrocarbon by itself and the knowledge that better performance is generally achieved by increasing the amount of NMP in a paint stripper composition. A further indication of the unobviousness of the compositions of this invention may be found in U.S. Pat. No. 4,120,810, which specifically teaches that paraffinic hydrocarbons should not be used in paint strippers containing NMP and an aromatic hydrocarbon.

EXAMPLES 19-26

The preparation of other paint remover compositions within the scope of this invention and containing different types and proportions of aliphatic hydrocarbons, miscibilizing solvents, thickeners, accelerators and surfactants is demonstrated by Examples 19-26, as shown in Tables IV and VI.

EXAMPLES 27-29

These examples show that the use of the paint remover compositions of Examples 19-21 results in the rapid removal of a variety of coatings (Table V). The test procedures described previously were employed.

TABLE I

| Example No. | Solvent | Solvent Weight Ratio | Time to Complete Lift (sec) |
|---|---|---|---|
| 1* | NMP | 100 | 120 |
| 2* | Xylene | 100 | No Removal |
| 3* | Mineral Spirits<sup>a</sup> | 100 | No Removal |
| 4* | NMP/Xylene | 50/50 | 120 |
| 5* | NMP/Mineral Spirits<sup>a</sup> | 50/50 | Immiscible Blend |
| 6 | NMP/Xylene/Mineral Spirits<sup>a</sup> | 33/33/33 | 75 |

*comparative example
<sup>a</sup>obtained from Aldrich Chemical Co.; b.p. 130-145°

TABLE II

COATINGS REMOVER COMPOSITIONS

| Component | 7 | 8* | 9* | 10* | 11* | 12* |
|---|---|---|---|---|---|---|
| NMP, pbw | 33<sup>a</sup> | 100 | — | — | 50 | 50 |
| Mineral Spirits<sup>b</sup>, pbw | 33 | — | 100 | — | — | — |
| Xylene, pbw | 33 | — | — | 100 | — | 50 |
| "AROMATIC 150"<sup>c</sup>, pbw | — | — | — | — | 50 | — |
| "MONOWET MO-70-R"<sup>d</sup>, pbw | 2.0 | 2.0 | — | 2.0 | 2.0 | 2.0 |
| "KLUCEL"<sup>e</sup>, pbw | 1.0 | 1.0 | — | — | 1.0 | 1.0 |

*comparative examples
<sup>a</sup>parts by weight
<sup>b</sup>obtained from Aldrich Chemical Co.; b.p. 130-145° C.
<sup>c</sup>an aromatic naphtha produced by Exxon Chemical Co.; b.p. 176-210° C.; predominately C<sub>9</sub>-C<sub>11</sub> aromatic hydrocarbons, including 10% naphthalene
<sup>d</sup>a dialkyl sulfosuccinate surfactant available from Mona Industries, Inc.
<sup>e</sup>a hydroxy proyl methy cellulose thickener available from Aqualon

TABLE III

PERFORMANCE OF COATINGS REMOVER COMPOSITIONS

| Example | 13 | 14* | 15* | 16* | 17* | 18* |
|---|---|---|---|---|---|---|
| Coatings Remover Composition | 7 | 8* | 9* | 10* | 11* | 12* |
| Paint Type | Time to Complete Lifting (sec). | | | | | |
| Acrylic Spray Enamel | 75 | 120 | n.r. | n.r. | 270 | 90 |
| Alkyd Enamel (White) | 80 | 120 | n.r. | n.r. | 165 | 90 |
| Epoxy Polyamide Enamel (White) | 300 | 210 | n.r. | n.r. | 540 | 180 |

*comparative example
n.r. = no removal

TABLE IV

COATINGS REMOVER COMPOSITIONS

| Component | 19 | 20 | 21 |
|---|---|---|---|
| NMP, pbw | 31 | 32 | 23 |
| Mineral Spirits, pbw | 23 | — | 45 |
| Mineral Oil, pbw | — | 30 | — |
| Xylene, pbw | — | 38 | 16 |
| Propylene Glycol Monomethyl Ether, pbw | 46 | — | — |
| Propylene Glycol Methyl Ether Acetate, pbw | — | — | 16 |
| "KLUCEL", pbw | 0.92 | — | 0.54 |
| Cellulose Acetate Butyrate, pbw | — | 0.64 | — |
| "MONOWET MO-70-R", pbw | 1.2 | 1.7 | 1.4 |

TABLE V

PERFORMANCE OF COATINGS REMOVER COMPOSITIONS

| Example | 27 | 28 | 29 |
|---|---|---|---|
| Coatings Remover Composition | 19 | 20 | 21 |
| Paint Type | Time to Complete Lifting (sec). | | |
| Acrylic Spray Enamel | 480 | 135 | 190 |
| Alkyd Enamel (White) | 195 | 70 | 120 |
| Epoxy Polyamide Enamel (White) | 540 | 240 | 390 |

TABLE VI

| Example | 22 | 23 | 24 | 25 | 26 |
|---|---|---|---|---|---|
| NMP, pbw | 30 | 50 | 20 | 40 | 25 |
| Aliphatic Hydrocarbons | "Exxsol D80"[1] | "Exxsol D110"[2] | "Gettysolve S-1"[3] | "Norpar 15"[4] | "Shell Sol 72"[5] |
| pbw | 50 | 25 | 30 | 30 | 35 |
| Miscibilizing Solvent | "Panasol An-3N"[6] | Cyclohexanone | Ethyl Valerate | Methyl Benzoate | Acetophenone |
| pbw | 20 | 25 | 50 | 30 | 40 |
| Surfactant | sodium dodecyl benzene sulfonate | "Igepal C0630"[7] | — | sodium xylene sulfonate | sodium lauryl sulfate |
| pbw | 1 | 2 | — | 4 | 3 |
| Thickener | "Methocel F-4M"[8] | Carboxyl methyl cellulose | ethyl cellulose | — | "Cab-O-Sil 720"[11] |
| pbw | 1 | 3.5 | .5 | — | 1 |
| Accelerator | Monoethanolamine | Diethanolamine | Acetic acid[9] | Formic acid[10] | — |

TABLE VI-continued

| Example | 22 | 23 | 24 | 25 | 26 |
|---|---|---|---|---|---|
| pbw | 1 | 5 | 6 | 9 | — |

[1] a dearomatized narrow-cut aliphatic solvent produced by Exxon Corporation (flash point 75° C.)
[2] a dearomatized narrow-cut aliphatic solvent produced by Exxon Corporation (flash point 100° C.)
[3] high flash mineral spirits produced by Getty Oil Company, b.p. 168-193° C.
[4] an aliphatic hydrocarbon solvent produced by Exxon Corporation, b.p. 252-272° C.
[5] an aliphatic hydrocarbon solvent produced by Shell Oil Company, b.p. 186-208° C.
[6] an aromatic hydrocarbon solvent produced by Amoco containing predominately mono- and dialkyl naphthalenes, b.p. 210-288° C.
[7] a non-ionic surfactant consisting of nonyl phenol reacted with 9 moles of ethylene oxide, available from GAF
[8] a methyl cellulose thickener produced by Dow Chemical Co.,: 2 pbw paraffin wax (mp. 46-57°) is also present in this formulation
[9] 1 pbw sodium benzoate is also present in this formulation as a corrosion inhibitor
[10] 3 pbw "Alox 575", a petroleum sulfonate corrosion inhibitor available from Alox Corporation, is also present in this formulation
[11] a fumed silica available from Cabot Corporation

What is claimed is:

1. A coating remover composition consisting essentially of a homogeneous blend of
    (a) from about 15 to 80 percent by weight of N-methyl-2-pyrrolidone;
    (b) from about 10 to 60 percent by weight of at least one aliphatic hydrocarbon containing from 6 to 30 carbon atoms and having a boiling point of at least 100° C.; and
    (c) from about 10 to 60 percent by weight of at least one miscibilizing solvent selected from the group consisting of aromatic hydrocarbons and ketones.

2. The coating remover composition of claim 1 wherein the miscibilizing solvent is an aromatic hydrocarbon.

3. A coating remover composition consisting essentially of a homogeneous blend of
    (a) from about 15 to 80 percent by weight of N-methyl-2-pyrrolidone;
    (b) from about 10 to 60 percent by weight of at least one aliphatic hydrocarbon containing from 6 to 30 carbon atoms and having a boiling point of at least about 100° C.; and
    (c) from about 10 to 60 percent by weight of at least one miscibilizing solvent selected from the group consisting of $C_1-C_8$ alkyl derivatives of benzene, naphthalene, $C_1-C_8$ alkyl derivatives of naphthalene, and $C_5-C_{12}$ aliphatic and aromatic ketones.

4. The coating remover composition of claim 3 wherein the aliphatic hydrocarbon is selected from the group consisting of mineral spirits and mineral oil.

5. The coating remover composition of claim 3 wherein the miscibilizing solvent is a $C_1-C_8$ alkyl derivative of benzene.

6. The coating remover composition of claim 3 wherein the miscibilizing solvent is selected from the group consisting of naphthalene, $C_1C_8$ alkyl derivatives of naphthalene, and mixtures thereof.

7. A coating remover composition consisting essentially of a homogeneous blend of
    (a) from about 15 to 80 percent by weight of N-methyl-2-pyrrolidone;
    (b) from about 10 to 60 percent by weight of at least one aliphatic hydrocarbon containing from 6 to 30 carbon atoms and having a boiling point of at least about 100° C.; and
    (c) from about 10 to 60 percent by weight of an aromatic hydrocarbon miscibilizing solvent.

8. The coating remover composition of claim 7 wherein the aromatic hydrocarbon miscibilizing solvent is selected from the group consisting of $C_1-C_8$ alkyl derivatives of benzene, $C_1-C_8$ alkyl derivatives of naphthalene, and mixtures thereof.

9. The coating remover composition of claim 7 wherein the aromatic hydrocarbon miscibilizing solvent is an aromatic naphtha.

10. A coating remover composition consisting essentially of
    (A) a homogeneous blend of
        (a) from about 15 to 80 percent by weight of the homogeneous blend of N-methyl-2-pyrrolidone;
        (b) from about 10 to 60 percent by weight of the homogeneous blend of at least one aliphatic hydrocarbon containing from 6 to 30 carbon atoms and having a boiling point of at least 100° C.; and
        (c) from about 10 to 60 percent by weight of the homogeneous blend of at least one miscibilizing solvent selected from the group consisting of aromatic hydrocarbons and ketones; and
    (B) an effective amount of at least one additive selected from the group consisting of surfactants, thickeners, and accelerators.

11. The coating remover composition of claim 10 wherein the miscibilizing solvent is an aromatic hydrocarbon.

12. A coating remover composition consisting essentially of
    (A) a homogeneous blend of
        (a) from about 15 to 80 percent by weight of the homogeneous blend of N-methyl-1-pyrrolidone;
        (b) from about 10 to 60 percent by weight of the homogeneous blend of at least one aliphatic hydrocarbon containing from 6 to 30 carbon atoms and having a boiling point of at least about 100° C.; and
        (c) from about 10 to 60 percent by weight of the homogeneous blend of at least one miscibilizing solvent selected from the group consisting of $C_1-C_8$ alkyl derivatives of benzene, naphthalene, $C_1-C_8$ alkyl derivatives of naphthalene, and $C_5-C_{12}$ aliphatic and aromatic ketones; and
    (B) an effective amount of at least one additive selected from the group consisting of surfactants, thickeners, and accelerators.

13. The coating remover composition of claim 12 wherein the aliphatic hydrocarbon is selected from the group consisting of mineral spirits and mineral oil.

14. A coatings remover composition consisting essentially of
    (A) a homogeneous blend of
        (a) from about 15 to 80 percent by weight of the homogeneous blend of N-methyl-2-pyrrolidone;
        (b) from about 10 to 60 percent by weight of the homogeneous blend of at least one aliphatic hydrocarbon containing from 6 to 30 carbon atoms and having a boiling point of at least about 100° C.; and (c) from about 10 to 60 percent by weight of the homogeneous blend of an aromatic hydrocarbon miscibilizing solvent;

(B) from about 0.1 to 15 percent by weight of the total composition of a thickener selected from the group consisting of alkylated, esterified, and oxyalkylated cellulose derivatives, organoclays, fatty acid salts, fumed silica, paraffinic waxes, and mixtures thereof; and (C) from about 0.1 to 8 percent by weight of the total composition of a surfactant selected from the group consisting of polyoxyethylene derivatives of aromatic and aliphatic alcohols, alkali metal salts of $C_8$ to $C_{22}$ aliphatic sulfates, alkali metal salts of alkyl aromatic sulfonates, dialkyl sulfosuccinates, and mixtures thereof; and (D) from 0 to about 20 percent by weight of the total composition of an accelerator selected from the group consisting of $C_1$–$C_{22}$ carboxylic acids and organoamines.

15. The coatings remover composition of claim 14 wherein the aromatic hydrocarbon miscibilizing solvent is selected from the group consisting of $C_1$–$C_8$ alkyl derivatives of benzene, naphthalene, $C_1$–$C_8$ alkyl derivatives of naphthalene, and mixtures thereof.

16. The coatings remover composition of claim 14 wherein the aromatic hydrocarbon miscibilizing solvent is an aromatic naphtha.

17. The coatings remover composition of claim 14 wherein the aliphatic hydrocarbon is selected from the group consisting of mineral spirits, mineral oil, or mixtures thereof.

* * * * *

UNITED STATES PATENT AND TRADEMARK OFFICE
CERTIFICATE OF CORRECTION

PATENT NO. : 5,015,410

DATED : May 14, 1991

INVENTOR(S) : Carl J. Sullivan

Figure 3:
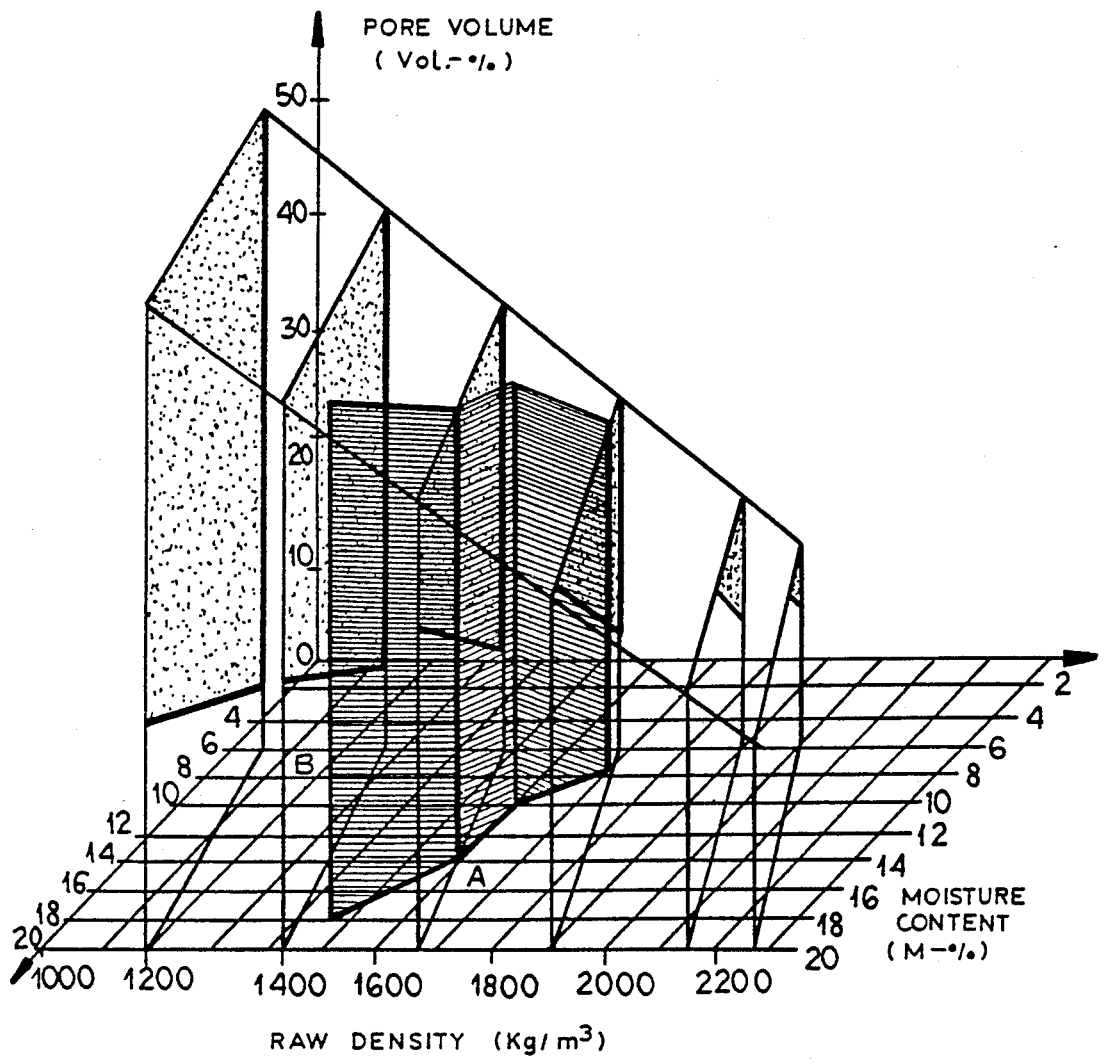
Figure 5:
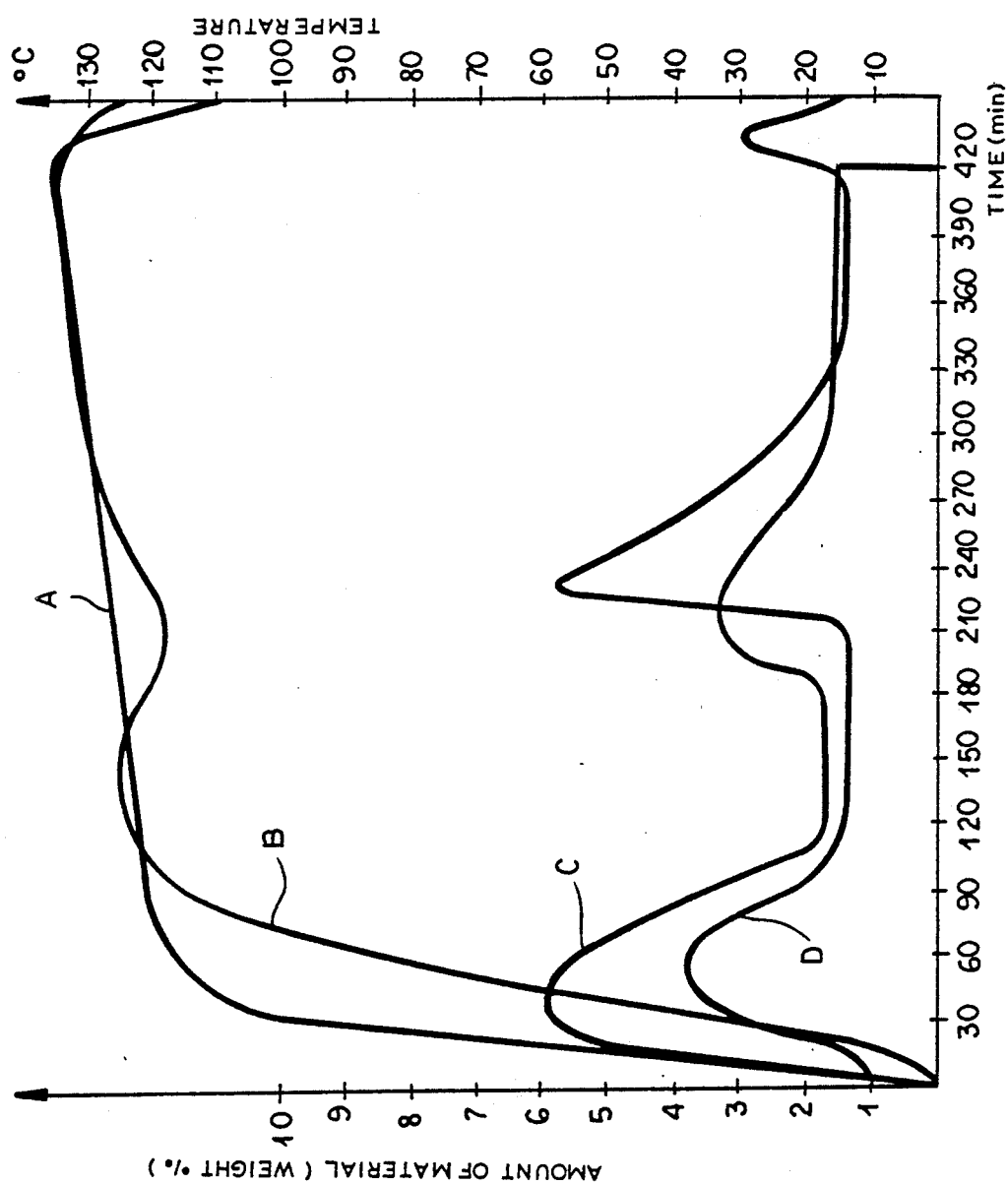
Figure 6:
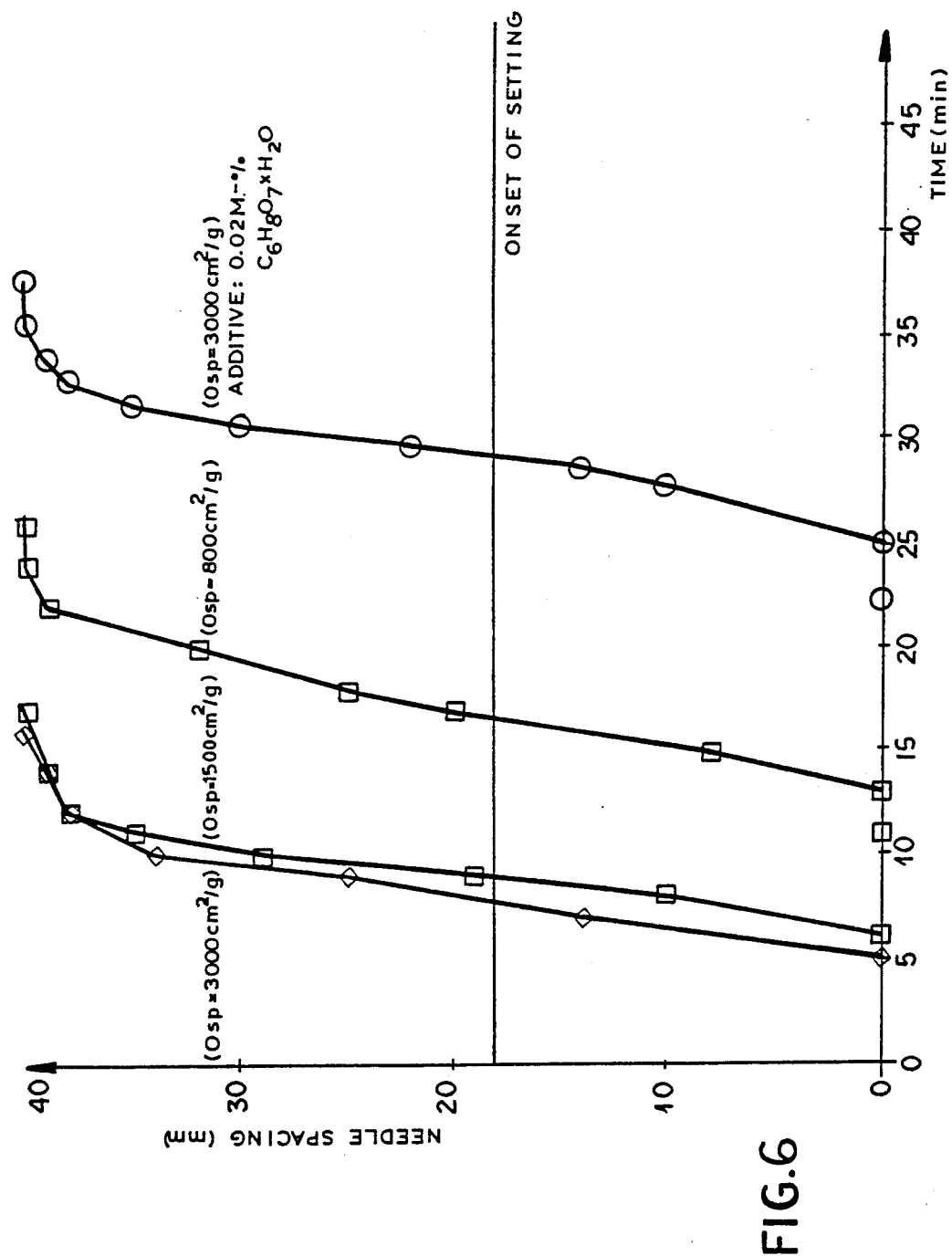
Figure 7:
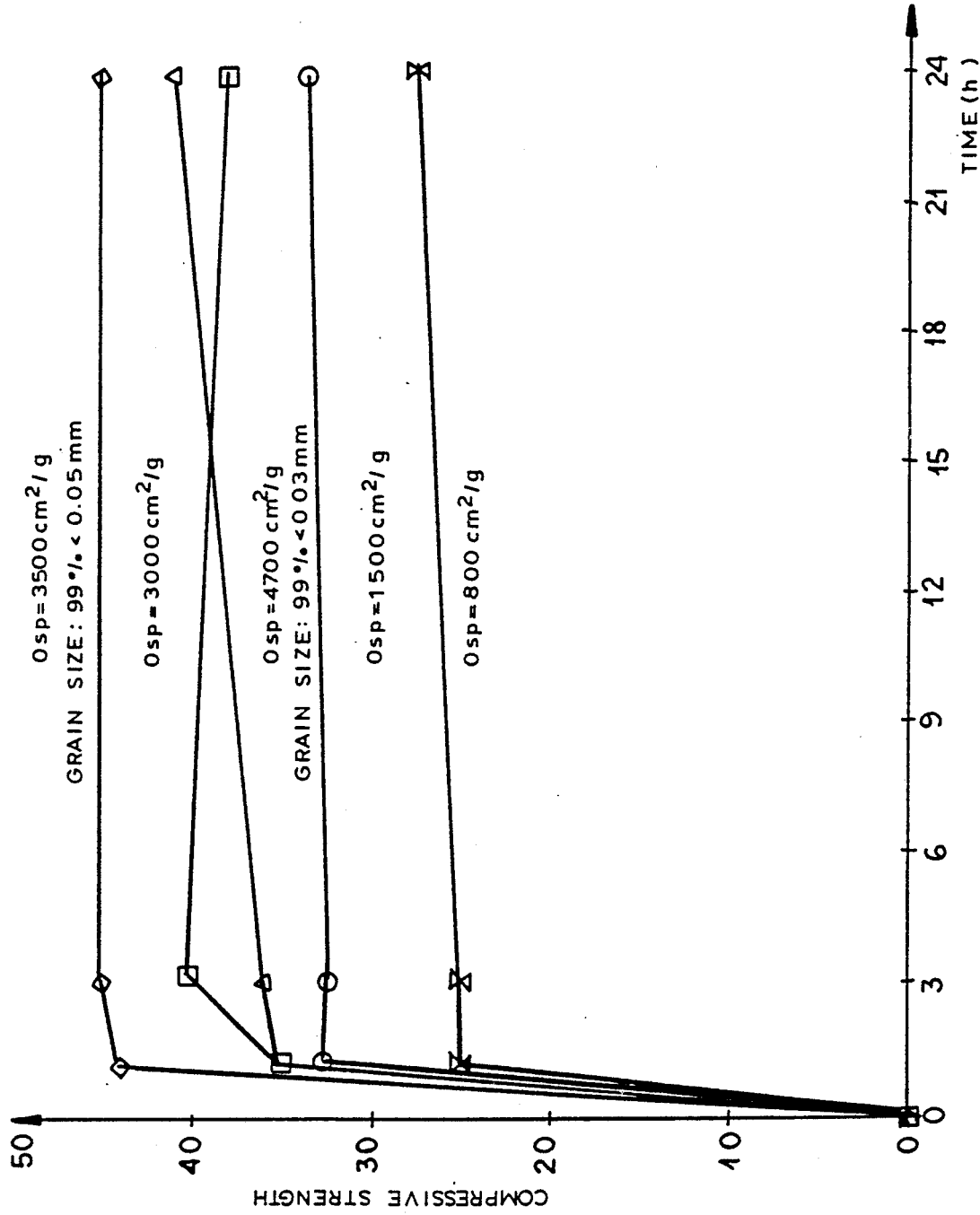

It is certified that error appears in the above-identified patent and that said Letters Patent is hereby corrected as shown below:

Please delete Fig. 1, Fig. 2, Fig. 3, Fig. 4, Fig. 5, Fig. 6, and Fig. 7.

Signed and Sealed this

Third Day of November, 1992

Attest:

DOUGLAS B. COMER

*Attesting Officer*   *Acting Commissioner of Patents and Trademarks*